(12) United States Patent
Braathen

(10) Patent No.: US 12,345,026 B2
(45) Date of Patent: Jul. 1, 2025

(54) WATER CABINET

(71) Applicant: Thor Frölich Braathen, Eggedal (NO)

(72) Inventor: Thor Frölich Braathen, Eggedal (NO)

( * ) Notice: Subject to any disclaimer, the term of this patent is extended or adjusted under 35 U.S.C. 154(b) by 0 days.

(21) Appl. No.: 18/572,650

(22) PCT Filed: Jun. 23, 2022

(86) PCT No.: PCT/EP2022/067179
§ 371 (c)(1),
(2) Date: Dec. 20, 2023

(87) PCT Pub. No.: WO2022/268955
PCT Pub. Date: Dec. 29, 2022

(65) Prior Publication Data
US 2024/0301668 A1 Sep. 12, 2024

(30) Foreign Application Priority Data
Jun. 23, 2021 (NO) .................................. 20210812

(51) Int. Cl.
*E03B 7/07* (2006.01)
(52) U.S. Cl.
CPC .............. *E03B 7/077* (2013.01); *E03B 7/078* (2013.01)
(58) Field of Classification Search
CPC .......... E03B 7/071; E03B 7/077; E03B 7/078; F16K 1/10; F16K 11/20; F16K 15/18;
(Continued)

(56) References Cited

U.S. PATENT DOCUMENTS 3,139,901 A * 7/1964 Camp ................ G05D 16/0613
137/505.38
3,982,561 A 9/1976 Harthun
(Continued)

FOREIGN PATENT DOCUMENTS

CN 107795732 A 3/2018
DE 102010001086 A1 7/2011
(Continued)

OTHER PUBLICATIONS

Patent Cooperation Treaty, International Application No. PCT/EP2022/067179, "International Search Report," Oct. 11, 2022, 3 pages.

*Primary Examiner* — Reinaldo Sanchez-Medina
(74) *Attorney, Agent, or Firm* — Bradley Arant Boult Cummings LLP

(57) ABSTRACT

A cold water cabinet (41) comprising a valve housing (22) intended for an ingoing pressure above 5 bars. The valve housing (22) is moulded in one unit and comprising therein a shut-off valve (2), a check valve (8), a control plug (12), a filter (13), and a combined pressure reduction valve (63) and water stop valve (30). The combined pressure reduction valve (63) and water stop valve (30) having a first spindle (26) with a plunger (28) at a first end. An opening between said plunger (28) and an associated seat (27) being controlled by a second spindle (29) and an adjustable spring (62) arranged at an opposite second end of said first spindle (26). The second spindle (29) being coupled to a motor (31), which is moving the plunger (28) against the seat (27) to close the water stop valve (30) when the motor receives a signal from at least one water leak sensor.

13 Claims, 8 Drawing Sheets

(58) Field of Classification Search
CPC . F16K 15/182; F16K 15/184; G05D 16/0402;
G05D 16/0655
See application file for complete search history.

(56) References Cited

U.S. PATENT DOCUMENTS

| | | | |
|---|---|---|---|
| 4,305,423 | A | 12/1981 | Adler |
| 4,991,655 | A | 2/1991 | McHugh |
| 7,540,957 | B1 | 6/2009 | Kurth et al. |
| 2017/0003692 | A1* | 1/2017 | Braga .................... G05D 7/005 |
| 2018/0142451 | A1* | 5/2018 | Braathen ................. E03B 7/095 |
| 2022/0228670 | A1* | 7/2022 | Lee ....................... F16K 15/063 |

FOREIGN PATENT DOCUMENTS

| | | | |
|---|---|---|---|
| DE | 202014102880 U1 | 9/2015 | |
| DE | 202015105690 U1 | 12/2015 | |
| EP | 1431466 A2 | 6/2004 | |
| EP | 1845430 A2 | 10/2007 | |
| EP | 2499410 B1 | 12/2017 | |
| EP | 2848846 B1 | 12/2018 | |
| EP | 3637216 A1 | 4/2020 | |
| FR | 2428195 A1 | 1/1980 | |
| GB | 2475936 A | 6/2011 | |
| JP | 2000145994 A | 5/2000 | |
| NO | 341490 B1 | 11/2017 | |
| WO | WO-2007096771 A2 | 8/2007 | |
| WO | WO-2012128645 A1 * | 9/2012 | ............... F16K 1/04 |
| WO | WO-2020242321 A1 | 12/2020 | |

\* cited by examiner

WATER CABINET

PURPOSE OF THE INVENTION

The purpose of the present invention is to provide a water cabinet, which contains a distribution pipe with fittings that can be coupled to pipes leading water to all tap locations in a house and which has space for valves and equipment which is decreed by regulations.

The invention in one embodiment to a cabinet with valves for cold water supply and distribution.

The invention relates in another embodiment to a cabinet with valves for hot water to prevent *Legionella* bacteria, which has approximately the same size as present combined cold and hot water cabinets.

The invention also provides novel valves with spindles preventing leakage.

The valves of the invention have a built-in water stop valve without a ball valve.

BACKGROUND ART

A prior art flow-stop valve is shown in FIG. 1. It comprises a motor to actuate a ball valve. The ball valve is rotated 90 degrees by the motor and stops the water flow if warned by sensors that a water leakage has occurred, and consequently prevent damage. The ball valve must be activated regularly in order to prevent jamming due to calcium deposits.

EP1845430A2 describes a pressure reduction valve, which is also shown in FIG. 2 herein. The valve comprises a housing 1 having an inlet indicated by the arrow marked 2 for incoming water, normally under high pressure, and an outlet indicated by the arrow marked 3 for outgoing water, normally under lower pressure than the incoming water, but with certain exceptions as will be explained in more detail below. Water flows into the valve through the inlet 2, then enters a chamber 17, and next flows through an opening defined by a seat 16, a stem 9 and a gasket 10 in order to then enter a chamber 18 after which it flows out through the outlet 3. The normal high-pressure side and low-pressure side of the valve are thus separated by an opening 21 between the chamber 17 and the chamber 18, the inlet 2 and the chamber 17 thus forming the high-pressure side of the valve whilst the chamber 18 and the outlet 3 form the low-pressure side of the valve. The housing 1 is arranged with a first axis (inlet/outlet axis) running through the centre of the inlet 2 and the outlet 3 at an oblique angle relative to a second axis (guiding axis) running through the centre of the stem 9 and a stem 14, and thus also at an oblique angle relative to the plane of the seat 16. This permits an extremely compact valve structure with low-pressure loss through the valve. At a first end of the stem 14, an operating hand wheel 15 is provided for the stop tap function, and, at a second end of the stem, a hole 19 is centrically arranged about the second axis for slidingly guiding a correspondingly shaped part of a gasket holder 11, on linear movement in the hole, along the second axis. The gasket 10 extends along the circumference of the gasket holder 11, and can be brought into contact with the seat 16 for closing the opening 21 between the two chambers 17 and 18. Along the second axis, the gasket holder 11, furthermore, is screwed onto one end of the stem 9, and screwed onto the other end of the stem 9 is a guide and supporting member 6 with a diaphragm 8 having a centrically arranged opening fixed in the junction between the stem 9 and the guide and supporting member 6. The guide and supporting member 6 is configured with a wing portion 7 for supporting contact with a lower surface of the diaphragm 8 and for linear guiding of the guide and supporting member 6 and other parts attached thereto along the second axis in that the periphery of the wing portion 7 is in sliding contact with an inner cylindrical surface of a spring housing 4 sealingly screwed into an opposite end of the housing 1 in relation to the end piece 12. A spiral spring 5 is disposed between the guide and supporting member 6 and the spring housing 4, and a first end of the spring 5 is in contact with a seat centrically arranged in the spring housing 4 whilst an opposite, second end of the spring 5 is held in place by a cylindrical projecting part of the guide and supporting member 6 arranged centrically about the second axis. As also can be seen from the drawing, the peripheral outer end of the diaphragm 8 is fixed between the housing 1 and the spring holder 4. Thus, two assemblies of different parts are provided along the second shaft, of which the assembly comprising the stem 14 provides the valve's stop tap function whilst the other assembly comprising the stem 9 provides the valve's pressure reducing function, and which assemblies can move linearly relative to each other along the second axis.

This known valve has no means for easy adjustment of the pressure.

PCT/NO2020/050140 describes a distributor pipe that is also shown in FIG. 2a herein. It shows a distributor pipe 1 in perspective view and illustrates connections 3, 4 having bores 21. The connections 3,4 are arranged with the centre line of their bores 21 placed outside of the main bore 15 of the distribution pipe 1. The distances between each connection 3, 4 are equal for the right and left side, and between each side. The bore 21 of a connector 3a and the main bore 15 of the distribution pipe 1 are overlapping in an overlap region, which provides a complete flow between the bores 21 and the main bore 15. The present invention is adapted to be used together with this known distributor pipe.

NO341490 shows a cabinet for hot or cold water. A pressure reduction valve is connected to a distribution pipe in the cabinet. The publication also describes a shut off valve, a non-return valve, a filter and a water stop valve. These parts are placed in two separate units.

Other relevant prior art references are DE 102010001086, FR 2428195 and DE 202014102880.

SUMMARY OF THE INVENTION

The present invention is defined by the appended claims. According to the invention one of more of the following advantages are achieved:

A cold water cabinet for inbound water having a pressure below 5 bars, having all the necessary functions, including water stop, in a single valve housing.

A cold water cabinet for inbound water having a pressure above 5 bars, having all the necessary functions, including water stop, in a single valve housing.

Only three necessary connections for valves, supply pipe, water meter and distribution pipe. Easy assembling and service for water filter in a much lower cabinet than present cabinets.

No *Legionella* bacteria since the cold water is divided from the hot water in two separate cabinets.

Valve spindles with quadruple safety against external leakage and safety to bypass, by activation of spindle, due to prevention of chalk pollution in plungers.

An upper valve part with motor actuator and auxiliary manual stop function, by which the motor can actuate the spindle and plunger to close against a seat.

Cabinet with outlet to drain, which secures against internal leakage in the cabinet and pipe-in-pipe type pipes from the cabinet, which are mounted in connections to a distribution pipe.

A new distribution pipe with a centre mounted connection for easy connection of water meter.

A hot water cabinet with all options, without or with a temperature regulation valve mounted therein. For long piping, an easy mounting of a circulation pump is provided, along with a return pipe to circulate water back to the water heater, to make hot water at the right temperature immediately available when a tap is opened.

DRAWINGS

Figure 3:
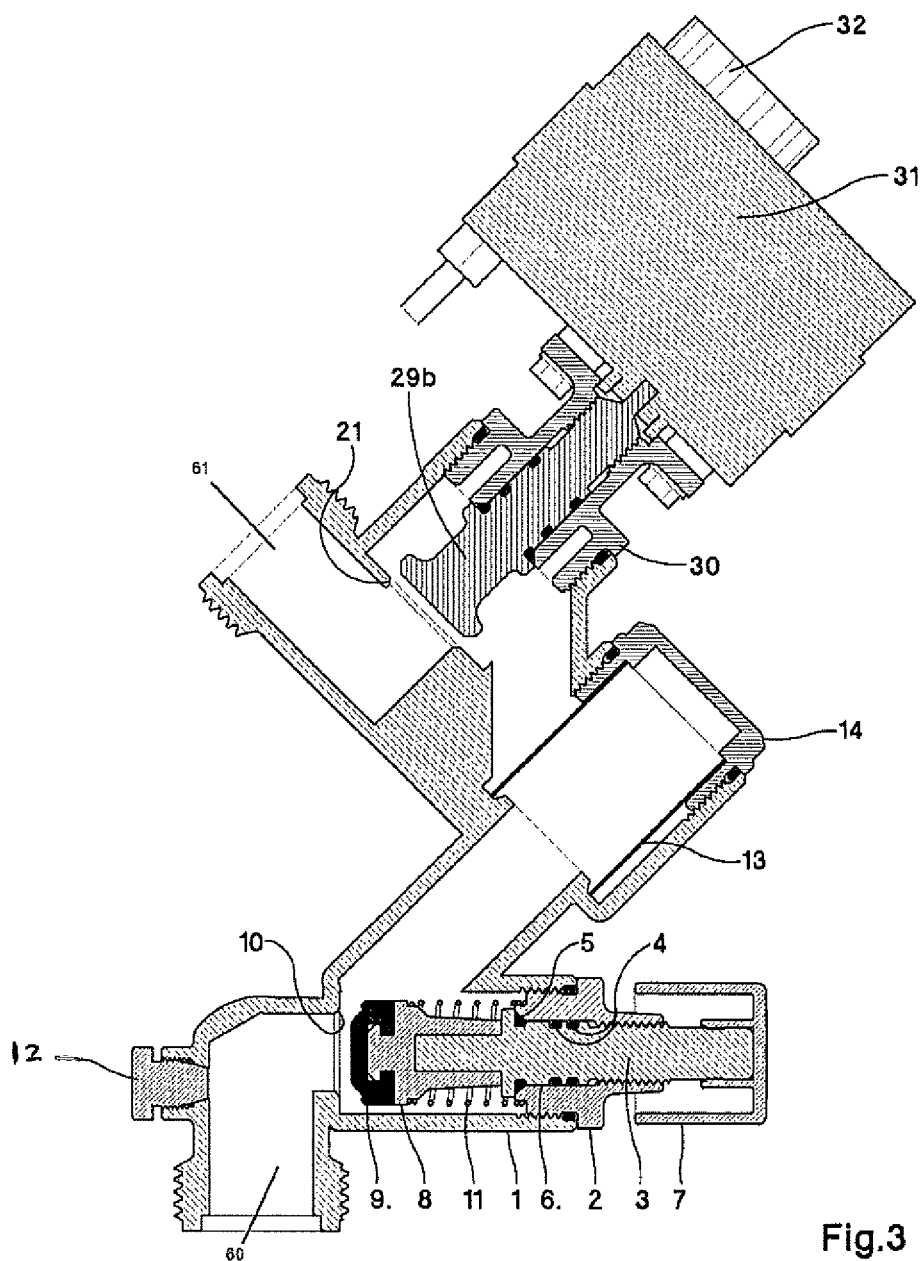
FIG. 3 shows a first embodiment according to the present invention of a combined valve having shut-off, pressure adjustment and water-stop functions.

FIG. 3 shows a valve 1 according to a first embodiment of the present invention. It comprises an upper part 2, a spindle 3 with two O-rings 4 and a cone and O-ring seal 5 for quadruple sealing against external water leakage. The cone and O-ring 5 prevent plaque in the cylinder 6 in open position. The control wheel 7 rotates the spindle 3 in and presses the check valve 8 with its rubber end 9 against a straight and conical seat 10 for double sealing by the shut-off valve function. By non-return function, a spring 11 pushes the check valve 8 with its outer end 9 against the straight portion of the seat 10 for sealing. Control of the sealing of check valve is done through an opening closed by a control screw 12.

During tapping, the water flows into the valve 1 at an inlet 60, through the check valve 9, up into a filter 13 for cleaning and into an upper part of the valve 1 and out through an outlet 61 when the water stop valve 30 is open to let water pass a seat 21.

During cleaning of the filter 13, the check valve 1 is closed by turning the wheel 7, and an internal tap (not shown) in the house is opened to relieve the pressure. A plug 14 is unscrewed for removal and cleaning of the filter 13. The cleaned filter 13 is thereafter mounted and the plug 14 is installed. The whole procedure may be performed in 2 minutes by the landlord.

The valve is provided with a water stop valve 30. A motor 31 actuates a spindle 29b to an open position for free passage of water past a seat 21. The spindle 29b has the same quadruple safety against leakage with 3 O-rings plus a cone at the outer end. The building has electrical sensors arranged at positions prone to water leakage. In case of a leakage, the sensor transmits a message to an electrical cabinet providing power to the motor 31, which then closes the water stop valve 30 by pushing the spindle 29b against the seat 21. A manual override button 32 may be used to close the shut-off valve.

The valve 1 is designed for external water pressure into the valve 1 at less than 5 bars. As explained, it comprises a shut-off valve, check valve, control plug, filter water stop valve by means of motor 31.

Figure 1:
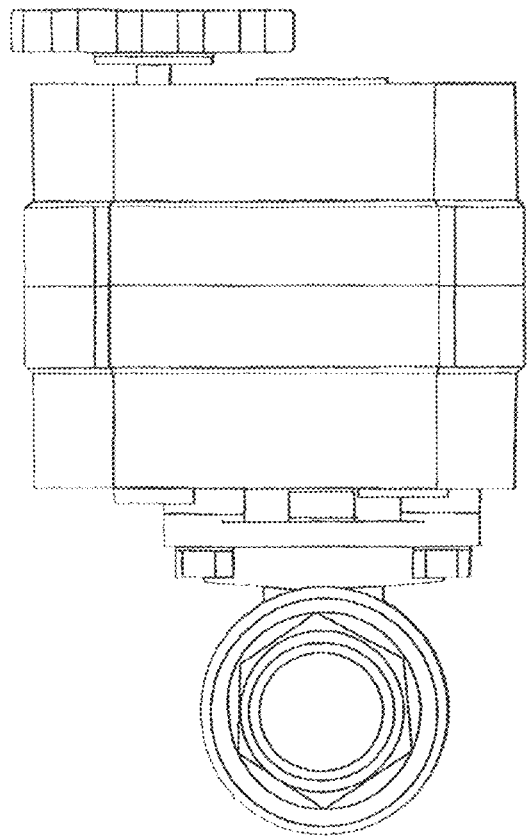
FIG. 1 shows a prior art flow-stop valve seen from the outside.
Figure 2:
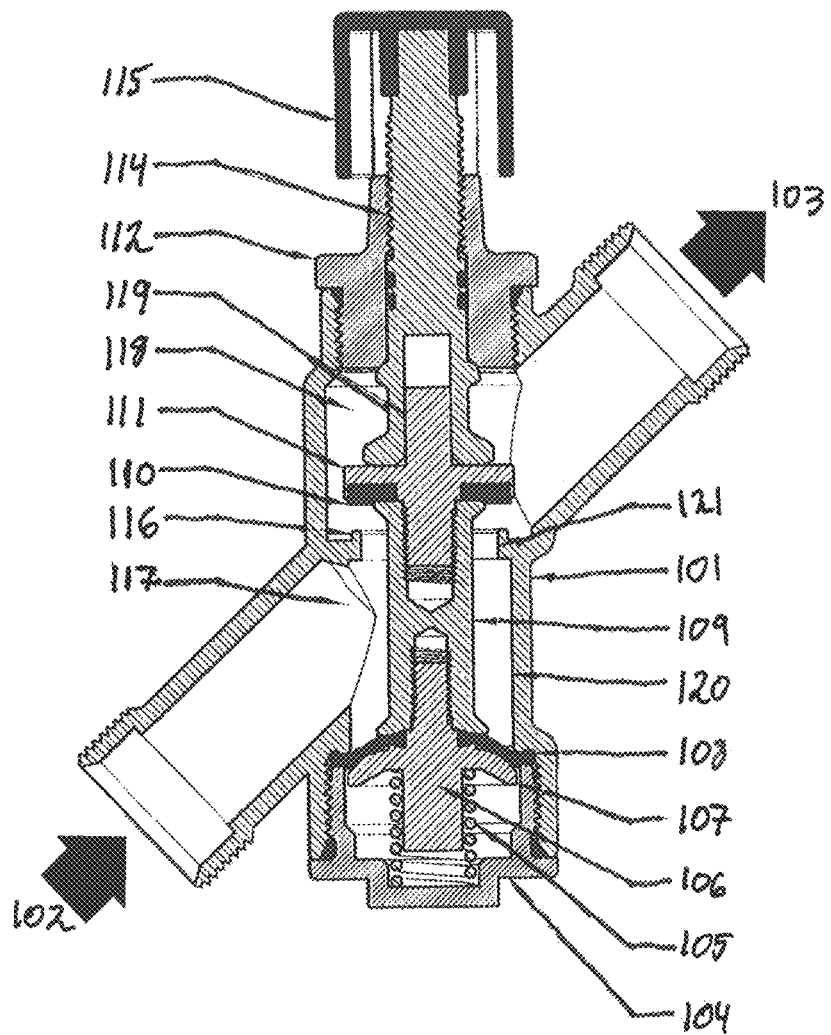
FIG. 2 shows a section of a prior art pressure reduction valve according to EP1845430A2.
Figure 2A:
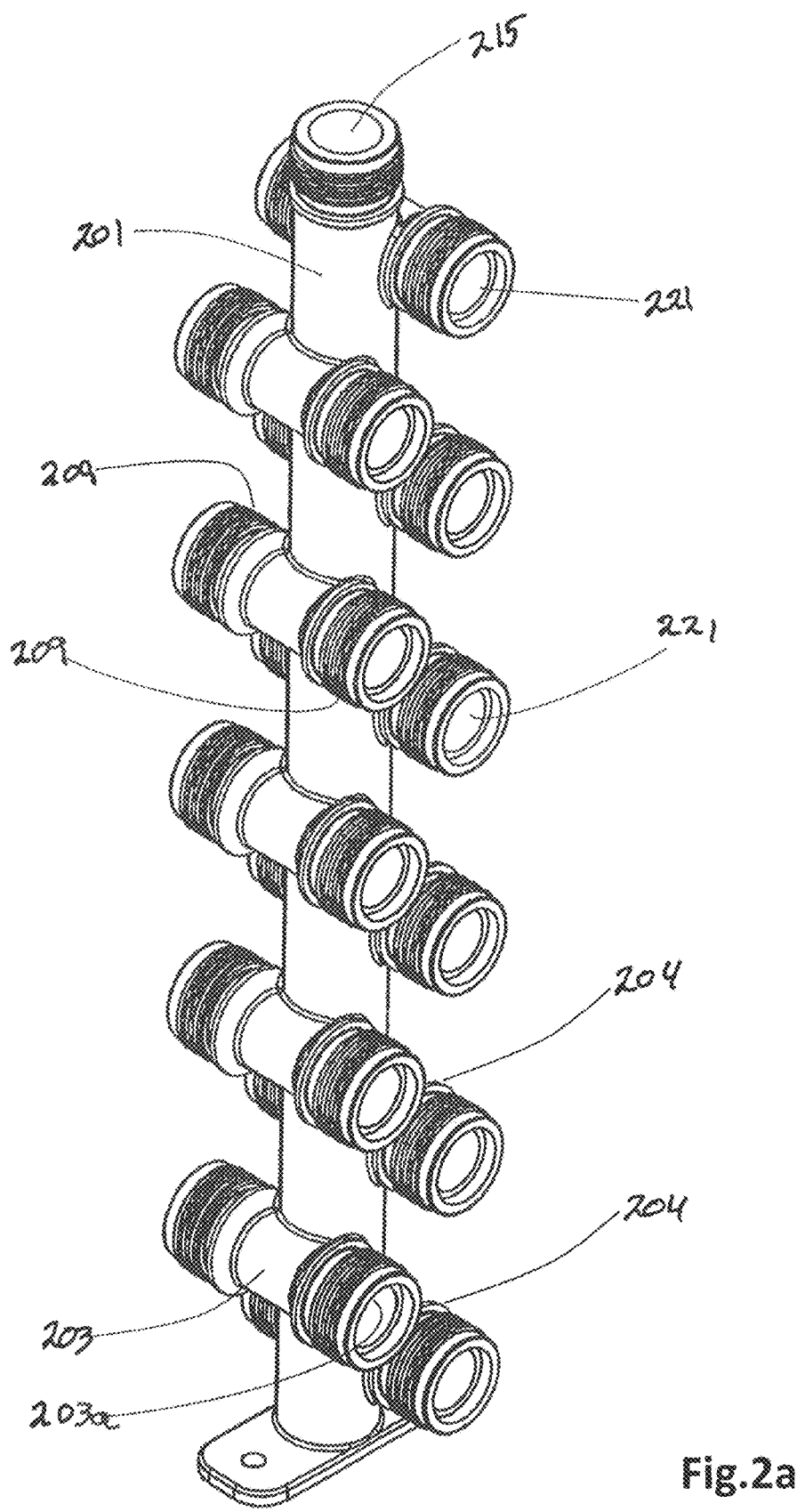
FIG. 2a shows a prior art distribution pipe 1 according to PCT/NO2020/050140.
Figure 4:
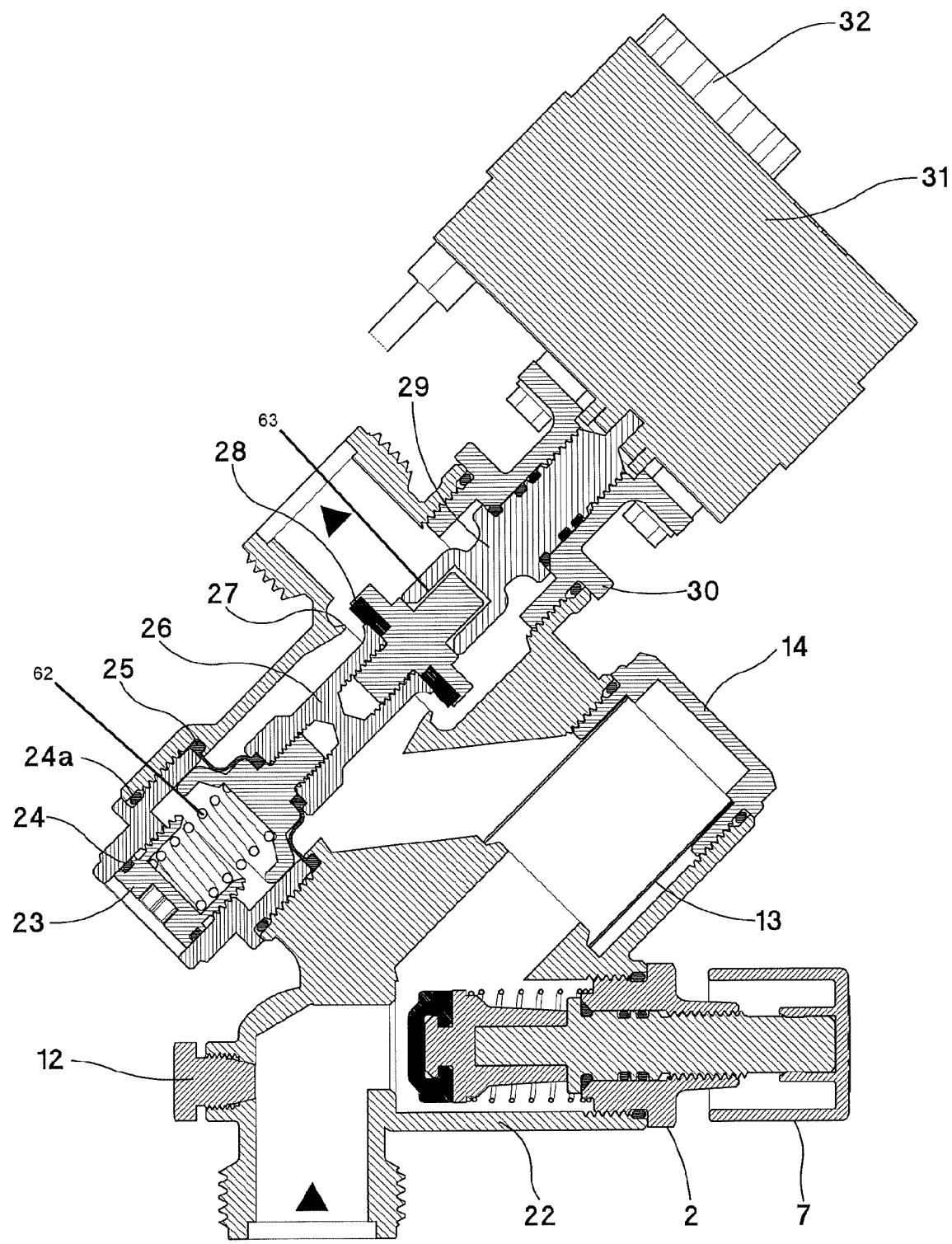
FIG. 4 shows a second embodiment according to the present invention of a combined valve having shut-off, pressure adjustment and water-stop functions.

FIG. 4 shows in a second embodiment, a valve for external ingoing pressure above 5 bars. A valve housing 22 has the same combined shut-off and check valve 2, control plug 12 and filter 13 with plug 14 as the embodiment of FIG. 3. Instead of the water stop valve of FIG. 3, this embodiment has a pressure reduction valve similar to the one shown in FIG. 2. Instead of the manual shut-off function through a wheel 15, a motor 31 has been coupled to the spindle 29, so that the valve can function as a water stop valve.

Moreover, the valve has been improved for regulation of the pressure to between 3 and 5 bars, by means of a set screw 23. O-rings 24 and 24a prevent external leakage if a membrane 25 is leaking. An inbound pressure from 16 to 5 bars presses against the membrane 25 which pushes on an axle 26 for larger or smaller opening through a seat 27. The whole valve is balanced with a spring 62 and pressure against a plunger 28, which is guided in a cylindrical hole 63 in the spindle 29. The motor 31, with an auxiliary manual closing 32 button, is provided at the upper end of the spindle 29. In case of a leakage inside the housing the provided sensors will send a message, and electricity will be provided to the motor, which then rotates the spindle approximately two turns and closes a plunger 28 against a seat 27. A water damage is thereby prevented.

The valve of FIG. 4 is thus a complete valve with shut-off function, check valve function and water stop function. The plunger 28 is being closed and opened at each tapping of a water tap in the building. Due to this regular movement of the plunger, it does not get stuck because of lime and will have a good function also as water stop function, when needed.

Figure 5:
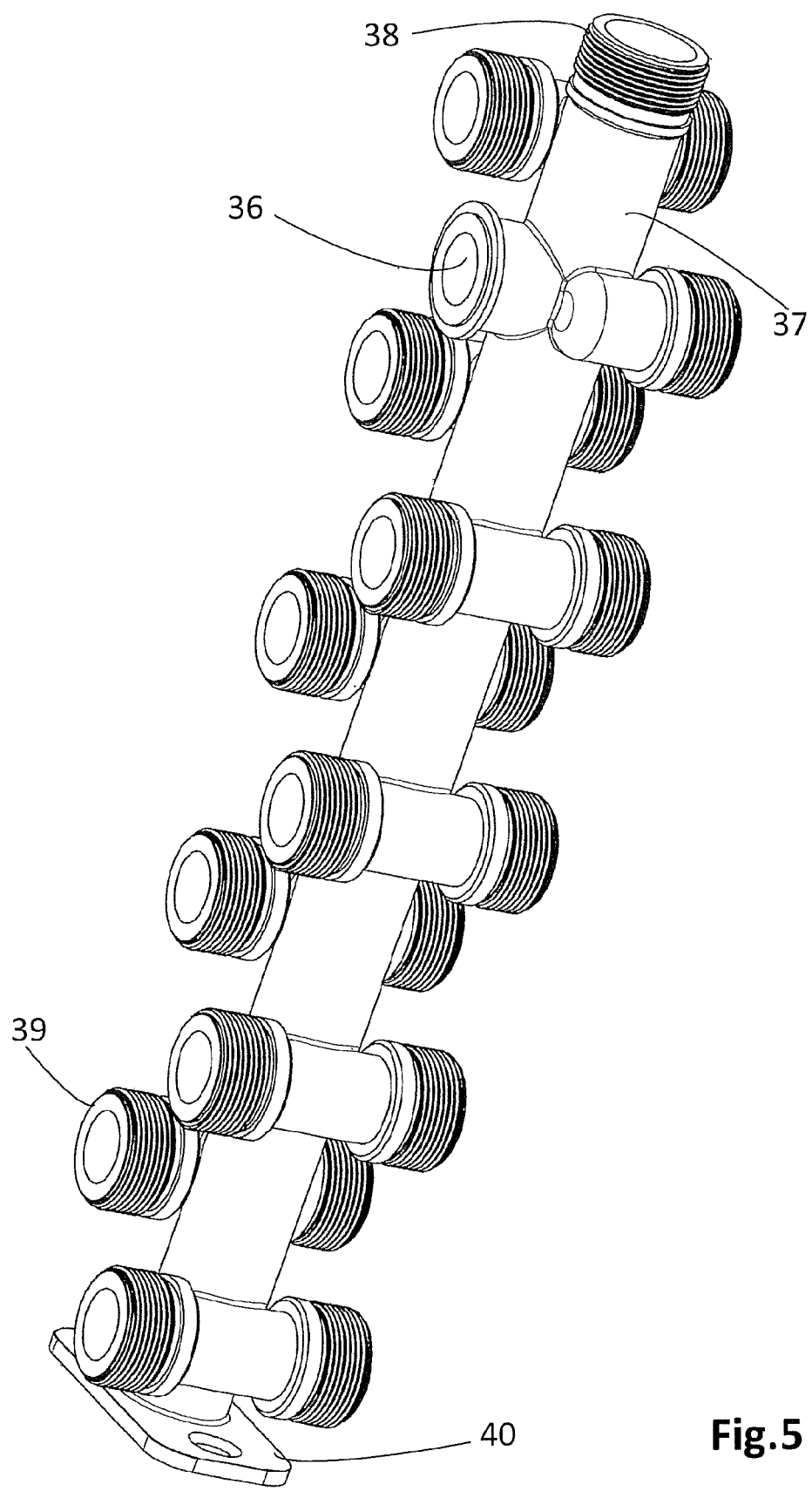
FIG. 5 shows a distribution pipe adapted to be used with the valves of FIGS. 3 and 4.

FIG. 5 shows a distribution pipe 37, which is generally of the type shown in PCT/NO2020/050140. In addition to the known features, the pipe 37 of FIG. 5 is improved with two alternative connections in the centre, a first connection 36 for incoming water in connection with a cold water meter (not shown), or a connection 38 for hot water. Connections 39 are for connection of pipes, with nine pipes upwards to the second floor and ten pipes downwards for first floor. A bracket 40 is integrated in the pipe 37 for mounting to a side wall in the cabinet.

Figure 6:
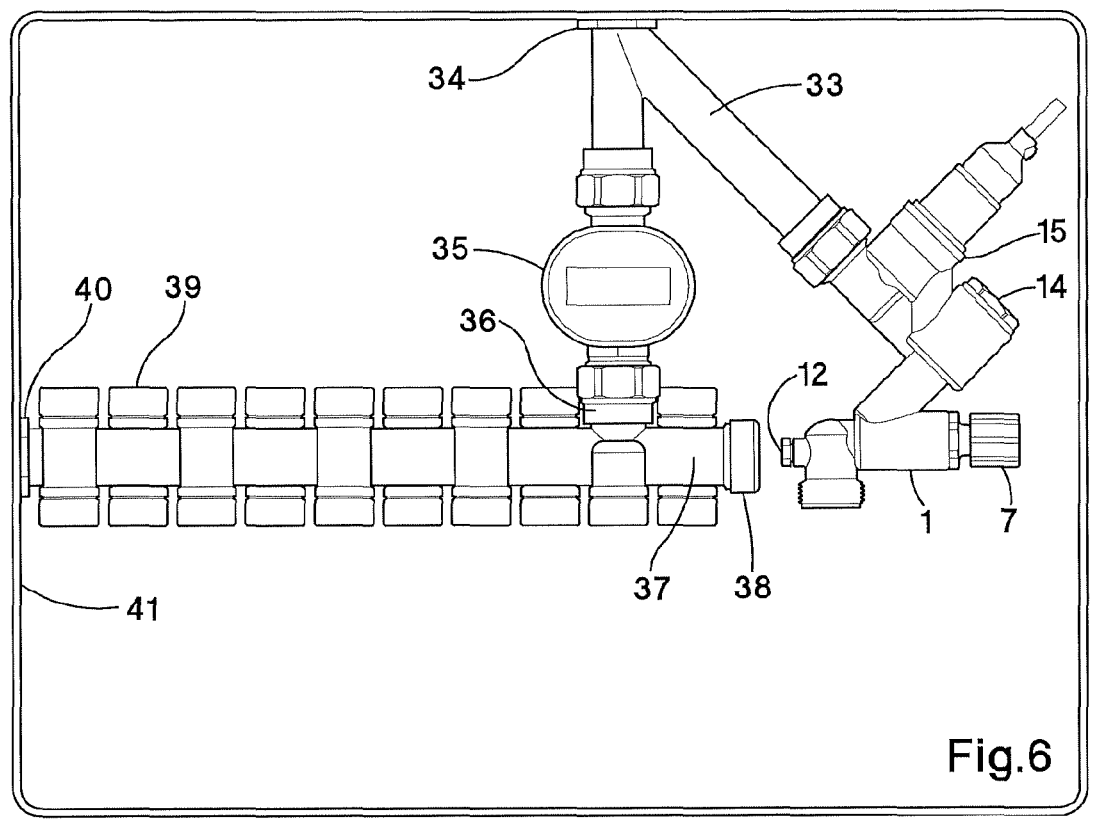
FIG. 6 shows a cold water cabinet with the distribution pipe of FIG. 5 and the valve of FIG. 3.

FIG. 6 shows a cold water cabinet 41 for consumption water with a ready provided valve group 1 for incoming pressure below 5 bars. It has a shut-off valve 7, a control plug 12, a plug 14 for access to a filter and water stop valve 15. The valve 1 is connected to a knee pipe 33 which other end is connected to a water meter 35, which in turn is connected at the opposite end to the distribution pipe 37. The distribution pipe 37 is attached to the side of the cabinet through the bracket 40 and the knee pipe 33 through a bracket 33 to the top of the cabinet 41. The pipe connections 39 are shown facing upwards and downwards, but the connected pipes are not shown. Due to the compact distribution pipe 37 and valve 1, the cabinet can be as small as 42 cm in height and 540 mm wide.

Figure 7:
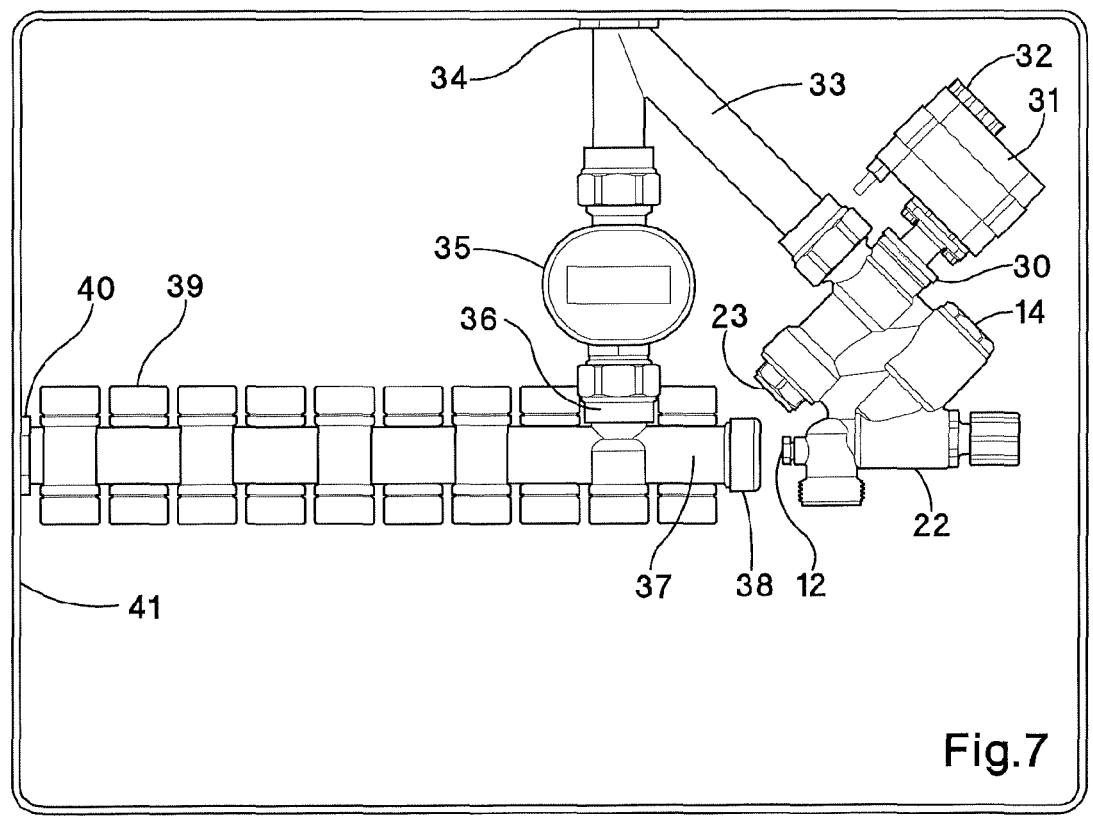
FIG. 7 shows a cold water cabinet with the distribution pipe of FIG. 5 and the valve of FIG. 4.

FIG. 7 shows the same cabinet 41 as in FIG. 6 with the knee pipe 33, the water meter 35 and the distribution pipe 37 attached to the cabinet through the brackets 34, 40. A valve 22 according to the embodiment of FIG. 4 is here mounted for an incoming pressure above 5 bars. A water stop valve 30 is also included.

As explained above in connection with FIG. 4, the plunger 28 can be activated to close against its seat 27 by rotating the spindle 29 rotations. The cabinet 4 has an outlet to drain (not shown) which secures against leakage in cabinet and the pipes connected to the distributor pipe 37 are of the pipe-in-pipe type.

Figure 8:
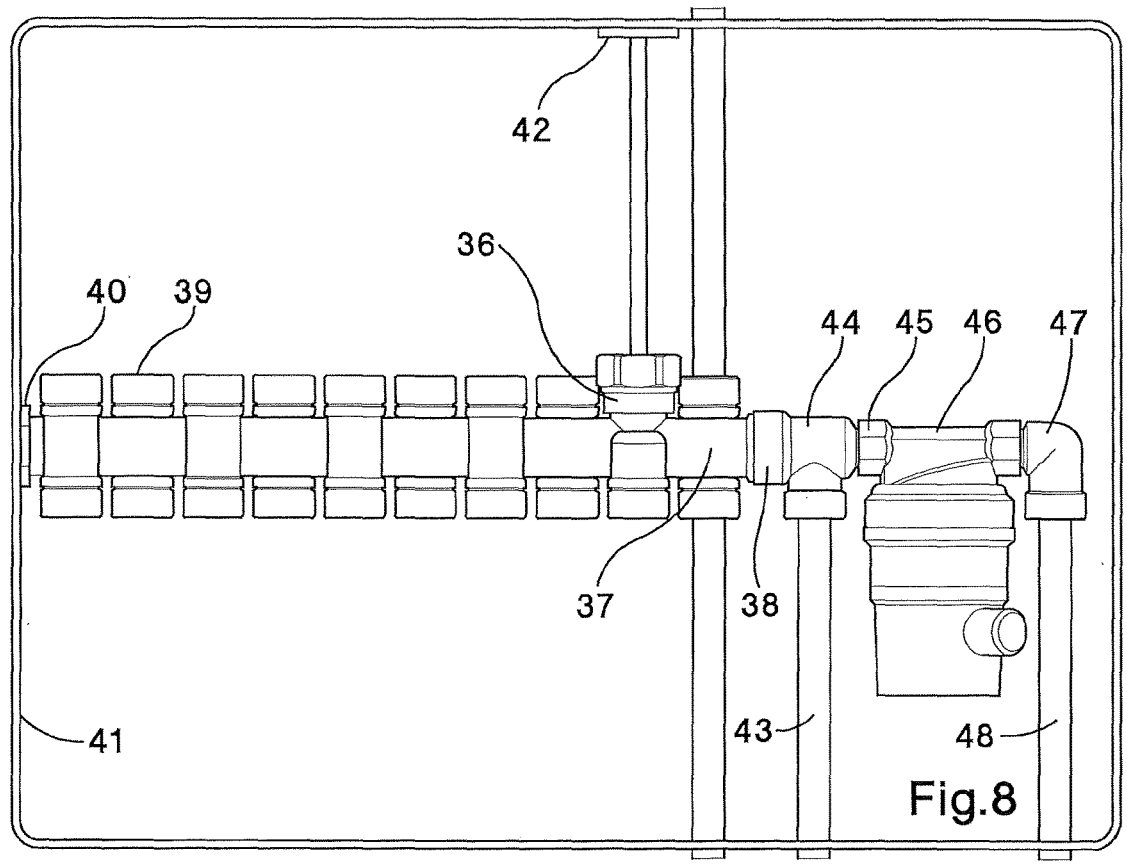
FIG. 8 shows a hot water cabinet with the distribution pipe of FIG. 5.

FIG. 8 shows a hot water cabinet 41 for hot consumption water. The distribution pipe 37 is connected to the left sidewall of the cabinet 40 and an attachment bolt 42 is attached to the top of the cabinet. The distribution pipe 37 has outlets 39 for nine pipes upwards and ten pipes downwards. A T-pipe 44 is mounted to the connection 38. Hot water from a water heater (not shown) having a temperature regulation valve (not shown) that is adjusted to provide 40-63 degrees water, is flowing into pipe 43 when a tap connected to one of the connections 39 is opened. A connection 45 of the T-tube 44 is plugged in a first embodiment.

In buildings with long pipes from the water heater and into the cabinet 41 through the pipe 43, a circulation pump 46 can be connected to the connection 45, which in turn is connected to a bend 47 and a return pipe 48 leading the water back to the tank of the water heater when there is no tapping of water. The water will then immediately have the right temperature when flowing to the tapping location. This results in less water and energy consumption since one does not have to wait for the correct temperature during tapping.

Figure 9:
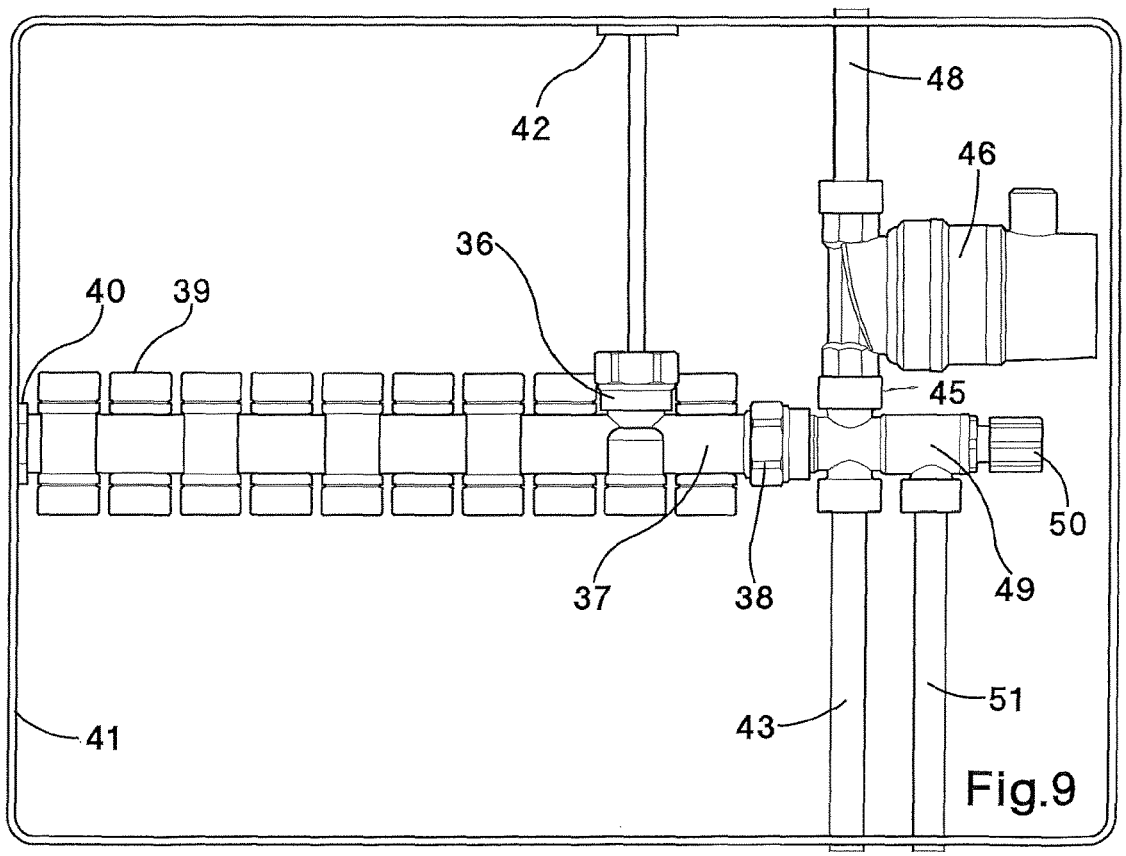
FIG. 9 shows a hot water cabinet with the distribution pipe of FIG. 5 and a pressure regulation valve.

FIG. 9 shows another embodiment of a hot water cabinet 41 for hot consumption water. The distribution pipe 37 is connected to the left side 40 of the cabinet and an attachment bolt 42 is attached to the top of the cabinet to a connection 36. The distribution pipe 37 has nine pipe connections 39 upwards and ten pipes downwards, one for each tapping location for hot water in the building.

In a building with a water heater without thermostatic mixing valve, a thermostatic mixing valve 49 can be mounted in the cabinet 41 into connection 38. During tapping, hot water is led from the water heater through a pipe 43 and cold water is lead through a pipe 51. These two water flows are mixing to the wanted temperature in the valve 49. The temperature is adjusted with wheel 50. Mixed water is led into the connection 38 and through the distributor pipe 37 and connection 39 to the tapping location. The valve 49 is in a first version plugged in connection 45 (not shown).

As explained above in connection with FIG. 8, when there is a long piping between the water heater and the cabinet 41, a circulation pump 45 with return pipe 48 to water heater can be attached to the connection 45.

The invention claimed is:

1. A combination valve having a valve housing intended for an ingoing pressure above 5 bars, wherein the valve housing being moulded in one unit and comprising therein a shut-off valve, a control plug, a filter, and a combined pressure reduction valve and water stop valve;
    the combined pressure reduction valve and water stop valve having a first axle;
    the first axle having a plunger at a first end;
    an opening between the plunger and an associated pressure reduction valve seat being controlled by a second spindle, the second spindle being coupled to the plunger at an opposite end thereof relative to the first axle, and an adjustable first spring arranged at an opposite second end of the first axle; the first axle, the plunger, the pressure reduction valve seat, the second spindle and the first spring being arranged concentric about a common axis; the second spindle being coupled to an actuator;
    the actuator actuating the second spindle to move the plunger against the pressure reduction valve seat and close the water stop valve, the actuator being coupled to at least one water leak sensor;
    wherein the shut-off valve is a combined check valve and shut off valve comprising a third spindle, a valve body received by the third spindle, the valve body having an outer end that is configured to seal against a check valve seat, a second spring configured to push the outer end against the check valve seat and a control wheel for manually rotating the third spindle and thereby pressing the outer end against the check valve seat.

2. The combination valve according to claim 1, wherein the third spindle of the shut off valve has at least two O-rings sealing against a first bore into which the third spindle is arranged, as well as a first conical seal at an end of the bore against a water side of the bore.

3. The combination valve according to claim 1, wherein the shut of valve has an outer end with a combined conical and planar seal that is adapted to cooperate with the check valve seat, the check valve seat being a combined conical and planar seat.

4. The combination valve according to claim 1, wherein a membrane is arranged between the first axle and the first spring, and that an adjustment screw is arranged at the opposite end of the first spring from the first axle.

5. The combination valve of claim 1, wherein the actuator is a motor.

6. The combination valve of claim 1, wherein the actuator is an expandable-wax actuator.

7. The combination valve according to claim 1, wherein the second spindle of the water stop valve has at least two O-rings sealing against a second bore into which said second spindle is arranged, as well as a second conical seal at an end of the second bore against a water side of the second bore.

8. A combination valve having a valve housing intended for an ingoing pressure below 5 bars, and for which a pressure reduction valve is omitted, the valve housing being moulded in one unit and comprising therein a shut-off valve, a control plug, a filter, and a water stop valve; the water stop valve having a first axle; the first axle having a plunger at a first end; the plunger being configured to seal against a plunger seat the first axle being coupled to an actuator; the actuator actuating first axle to move the plunger against the plunger seat and close the water stop valve, the actuator being coupled to at least one water leak sensor, wherein the shut-off valve is a combined check valve and shut off valve comprising a third spindle, a valve body received by the spindle, the valve body having an outer end that is configured to seal against a check valve seat, a second spring configured to push the outer end against the check valve seat and a control wheel for manually rotating the third spindle and thereby pressing the outer end against the check valve seat.

9. The combination valve according to claim 8, wherein the third spindle of the shut off valve has at least two O-rings sealing against a first bore into which the third spindle is arranged, as well as a first conical seal at an end of the first bore against a water side of the first bore.

10. The combination valve according to claim 8, wherein the shut of valve has an outer end with a combined conical and planar seal that is adapted to cooperate with the check valve seat, the check valve seat being a combined conical and planar seat.

11. The combination valve of claim 8, wherein the actuator is a motor.

12. The combination valve of claim 8, wherein the actuator is an expandable-wax actuator.

13. The combination valve according to claim 8, wherein the first axle of the water stop valve has at least two O-rings sealing against a second bore into which said first axle is arranged, as well as a second conical seal at an end of the second bore against a water side of the second bore.

\* \* \* \* \*